United States Patent
Harvill et al.

[19]

[11] Patent Number: 5,986,643
[45] Date of Patent: Nov. 16, 1999

[54] TACTILE FEEDBACK MECHANISM FOR A DATA PROCESSING SYSTEM

[75] Inventors: Young L. Harvill; Jean-Jacques G. Grimaud; Jaron Z. Lanier, all of Palo Alto, Calif.

[73] Assignee: Sun Microsystems, Inc., Palo Alto, Calif.

[21] Appl. No.: 08/335,302

[22] Filed: Oct. 27, 1992

Related U.S. Application Data

[63] Continuation of application No. 07/746,292, Aug. 13, 1991, abandoned, which is a continuation of application No. 07/315,252, Feb. 21, 1989, abandoned, which is a continuation of application No. 07/029,930, Mar. 24, 1987, abandoned.

[51] Int. Cl.$^6$ .................................................. G09G 5/10
[52] U.S. Cl. ............................ 345/156; 345/156; 341/27
[58] Field of Search .................................. 345/145, 156, 345/157, 163, 168, 169, 158; 341/24, 27; 273/148 B; 200/5 A; 473/37–38

[56] References Cited

U.S. PATENT DOCUMENTS

| 1,335,272 | 3/1920 | Broughton . |
| 2,356,267 | 8/1944 | Pelunis . |

(List continued on next page.)

FOREIGN PATENT DOCUMENTS

| 3334395 | 4/1985 | Germany . | |
| 3442549A1 | 5/1986 | Germany . | |
| 60-179821 | 9/1985 | Japan | 340/710 |
| 1225525 | 4/1986 | U.S.S.R. . | |
| 2 013 617 | 8/1979 | United Kingdom . | |

OTHER PUBLICATIONS

"Digital Actuator Utilizing Shape Memory Effect", Honma, et al. lecture given at 30th Anniversary of Tokai Branch foundation on Jul. 14, 1981, pp. 1–22.

"Micro Manipulators Applied Shape Memory Effect", Honma et al., pape presented at 1982 Precision Machinery Assoc. Autumn Conference o Oct. 20. (Also in Japanese) pp. 1–21.

"Analysis of Muscle Open and Closed Loop Recruitment Forces: Preview to Synthetic Proprioception", Solomonow, et al., *IEE Frontier of Engineering and Computing in Health Care* , 1984. pp. 1–3.

"Shape Memory Effect Alloys for Robotic Devices", Schetky, L. *Robotics Age*, Jul., 1984, pp. 13–17.

"Laboratory Profile", R & D Frontiers pp. 1–12.

"Hitachi's Robot Hand", Nakano, et al., *Robotics Age*, Jul., 1984 pp. 18–20.

Fisher et al, "Virtual Environment Display System", ACM 1996 Workshop on Interactive 3D Graphics, Oct. 23–24, 1986, Chapel Hill, N. Carolina, pp. 1–11.

(List continued on next page.)

*Primary Examiner*—Lun-Yi Lao
*Attorney, Agent, or Firm*—Conley, Rose & Tayon, PC; B. Noel Kivlin

[57] ABSTRACT

An apparatus for providing a tactile stimulus to a part of the body of a physical operator when a virtual operator, created by movements of the physical operator, encounters a virtual object defined by a computer. A signalling unit communicates with the computer and emits a signal when the virtual operator encounters a virtual object. A stimulus unit responsive to the signalling unit is disposed in close proximity to a part of the body of the physical operator for providing a tactile stimulus when the virtual operator encounters a virtual object. The stimulus unit may comprise a segment of memory metal which undergoes a martensitic transformation to a different form or a solenoid having a member which moves in response to a signal emitted by the signalling unit. A vibrating member, such as a piezoceramic bender may be used instead of or in addition to the solenoid or memory metal.

15 Claims, 4 Drawing Sheets

U.S. PATENT DOCUMENTS

| | | |
|---|---|---|
| 3,510,210 | 5/1970 | Haney . |
| 3,777,086 | 12/1973 | Riedo . |
| 4,059,830 | 11/1977 | Threadgill .............................. 340/407 |
| 4,074,444 | 2/1978 | Laenger . |
| 4,209,255 | 6/1980 | Heynau . |
| 4,302,138 | 11/1981 | Zarudiansky . |
| 4,355,805 | 10/1982 | Baer et al. . |
| 4,408,495 | 10/1983 | Couch et al. . |
| 4,414,537 | 11/1983 | Grimes . |
| 4,414,984 | 11/1983 | Zarudiansky . |
| 4,524,348 | 6/1985 | Lefkowitz . |
| 4,540,176 | 9/1985 | Baer .................................. 273/148 B |
| 4,542,291 | 9/1985 | Zimmerman . |
| 4,544,988 | 10/1985 | Hochstein . |
| 4,553,393 | 11/1985 | Ruoff . |
| 4,558,704 | 12/1985 | Petrofsky . |
| 4,565,999 | 1/1986 | King et al. . |
| 4,569,599 | 2/1986 | Bolkow et al. . |
| 4,579,006 | 4/1986 | Hosoda . |
| 4,581,491 | 4/1986 | Boothroyd .............................. 340/407 |
| 4,586,335 | 5/1986 | Hosoda et al. . |
| 4,586,387 | 5/1986 | Morgan et al. . |
| 4,613,139 | 9/1986 | Robinson ........................... 273/148 B |
| 4,634,856 | 1/1987 | Kirkham . |
| 4,654,520 | 3/1987 | Griffiths . |
| 4,654,648 | 3/1987 | Herrington et al. . |
| 4,660,033 | 4/1987 | Brandt . |
| 4,665,388 | 5/1987 | Ivie et al. . |
| 4,682,159 | 7/1987 | Davison . |
| 4,711,543 | 12/1987 | Blair et al. . |
| 4,715,235 | 12/1987 | Fukui et al. . |
| 4,763,284 | 8/1988 | Carlin ...................................... 364/550 |
| 4,771,344 | 9/1988 | Fallacaro et al. ....................... 358/335 |

OTHER PUBLICATIONS

Bliss et al, "Optical–to–Tactile Image Conversion for the Blind", IEEE Transactions on Main–Machine Systems, Mar. 1970, pp. 58–65.

"Seeing Eye Mouse", IBM Disclosure Bulletin, vol. 28, No. 3, Aug. 1985, pp. 1343–1344.

Nassimseve et al, "Digital Display for the Blind", IBM Disclosure Bulletin, vol. 17, No. 12, May 1975, pp. 3733–3735.

Herot et al; *One–Point Touch Input of Vector Information for Computer Displays*; Computer Graphics; vol. 12, No. 3; Aug. 1978; reprinted in IEEE Cat No. EHO 147–9 pp. 275–281.

TACTILE FEEDBACK MECHANISM FOR A DATA PROCESSING SYSTEM

This is a Continuation of application Ser. No. 07/746,292 filed Aug. 13, 1991, now abandoned, which is a continuation of Ser. No. 07/315,252, filed Feb. 21, 1989, now abandoned, which is a continuation of Ser. No. 07/029,930, filed Mar. 24, 1987, now abandoned.

BACKGROUND OF THE INVENTION

1. Field Of The Invention

This invention relates to an apparatus for manipulating virtual objects defined by a computer based on movement of a part of a body of a physical operator and, more particularly, to an apparatus for providing a tactile stimulus to a part of the body of the physical operator when a virtual operator, created from movements of the physical operator, encounters the virtual object.

2. Description Of The Relevant Art

Many input devices are used to manipulate virtual objects represented by a computer system. For example, keyboards, joy sticks, mice, track balls, and light pens often are used to position a cursor at a desired location on a video screen so that operations may be selected without the necessity of keying in multiple commands on a keyboard. However, mastering the operation of such input devices is often difficult because the hand movements required to operate the devices do not correspond to the visual feedback presented by the display screen of the computer.

One method and apparatus which overcomes the foregoing disadvantage is described in U.S. Pat. No. 4,988,891 entitled "Computer Data Entry And Manipulation Apparatus And Method." That invention is directed to an apparatus for converting gestures and positions of the hand of a physical operator into a virtual operator, such as an animated version of the hand, for manipulating virtual objects defined by the computer. Because one object of such a system is to provide a realistic simulation of virtual object manipulation by a physical operator, it would be helpful if the physical operator was provided with tactile feedback so that the operator would have a more reliable and realistic indication of when the virtual operator is deemed to have encountered the virtual object.

SUMMARY OF THE INVENTION

The present invention is an apparatus for providing a tactile stimulus to a part of the body of a physical operator when a virtual operator, created by movements of the physical operator, encounters a virtual object defined by a computer. In one embodiment of the present invention, a signalling unit communicates with the computer and emits a signal when the virtual operator encounters a virtual object. A stimulus unit responsive to the signalling unit is disposed in close proximity to a part of the body of the physical operator for providing a tactile stimulus to the physical operator when the virtual operator encounters the virtual object. Such tactile feedback not only provides realism, but it allows the operator to sense when the virtual object has been grasped adequately and correctly by the virtual operator for performing delicate functions.

The stimulus means in the embodiment comprises a segment of memory metal disposed in close proximity to a part of the body of the physical operator (e.g., wrapped around a finger of the physical operator). When the virtual operator encounters the virtual object, a transistor connected to the memory metal and to the signalling unit flows a current through the memory metal sufficient to raise the temperature of the memory metal so that the memory metal exhibits a shape memory effect and undergoes a martensitic transformation to a different form, whereby the movement of the metal into the different form imparts a tactile stimulus to the physical operator.

In another embodiment of the invention, a solenoid having a member which moves in response to the signal emitted by the signalling unit is disposed in close proximity to a part of the body of the physical operator, and the moving member provides a tactile stimulus to the physical operator whenever the virtual operator encounters the virtual object. For example, a coil may be wrapped around a finger of the operator, and magnets disposed between the coil and the finger vibrate in response to a periodic signal emitted by the signalling unit. Alternatively, a vibrating member, such as a piezoceramic bender, may be placed in close proximity to a part of the body of the physical operator (e.g., the fingertips of the operator's hand) for vibrating in response to the periodic signal emitted by the signalling unit.

DETAILED DESCRIPTION OF THE PREFERRED EMBODIMENTS

Figure 1:
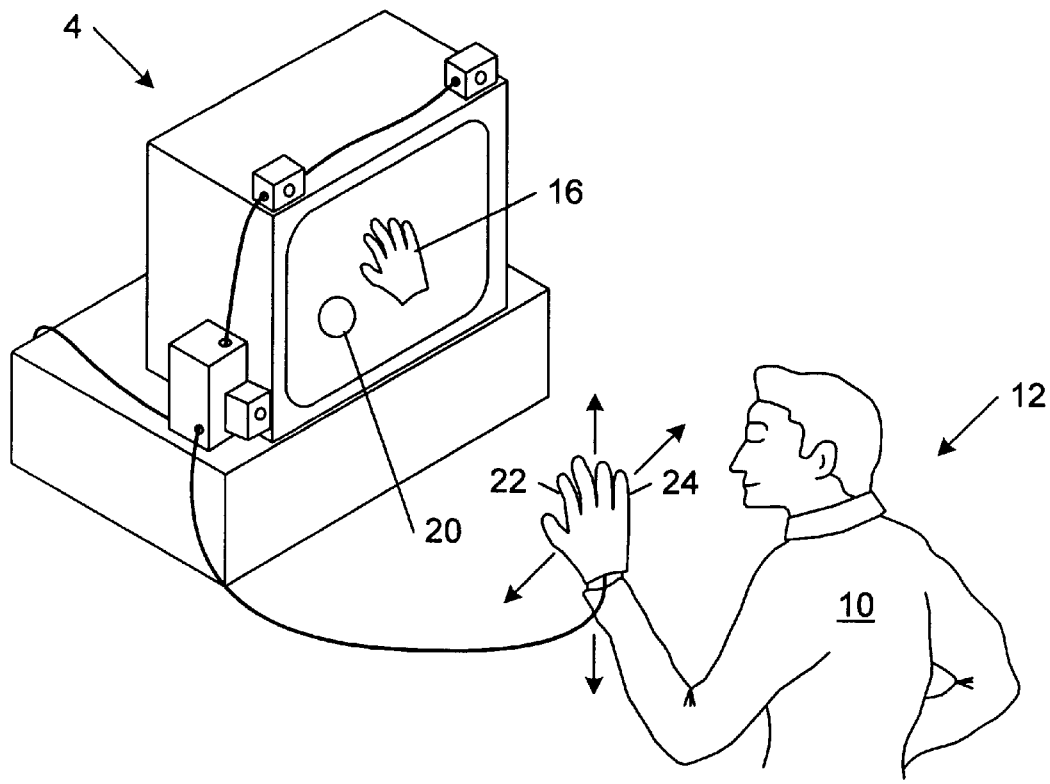
FIG. 1 is an overall perspective view of a data processing system according to the present invention wherein movements of a part of a body of a physical operator are converted into a virtual operator for manipulating a virtual object represented within the data processing system.

FIG. 1 is an overall perspective view of a data processing system 4 wherein movements of a part of a physical body 10 of an operator 12 are converted into a virtual operator 16 for manipulating a virtual object 20 represented within data processing system 4. The movements of physical operator 12 preferably are converted into virtual operator 16 through instrumentation disposed in close proximity to a part of the body of physical operator 12, preferably on the clothing of physical operator 12. For purposes of illustration, the movements of a hand 22 of physical operator 12 are converted into virtual operator 16 through a glove 24 instrumented as described in U.S. Pat. No. 4,988,891 entitled "Computer Data Entry And Manipulation Apparatus And Method." It is to be understood, however, that the present invention may be employed with any part of the body of physical operator 12 which may be used for manipulating virtual objects defined by data processing system 4.

Figure 2:
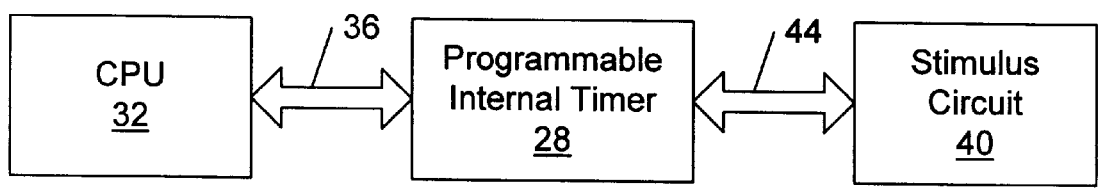
FIG. 2 is a block diagram of a tactile stimulus mechanism according to the present invention.

FIG. 2 is a block diagram of a tactile stimulus mechanism according to the present invention. As shown therein, a programmable interval timer 28, readily available as part No. 8253 from Intel Corporation, receives data from a CPU 32 of data processing system 4 through a bus 36. Internal timer 28 provides a signal to a stimulus circuit 40 through a bus 44 whenever virtual operator 16 encounters virtual object 20.

Figure 3:
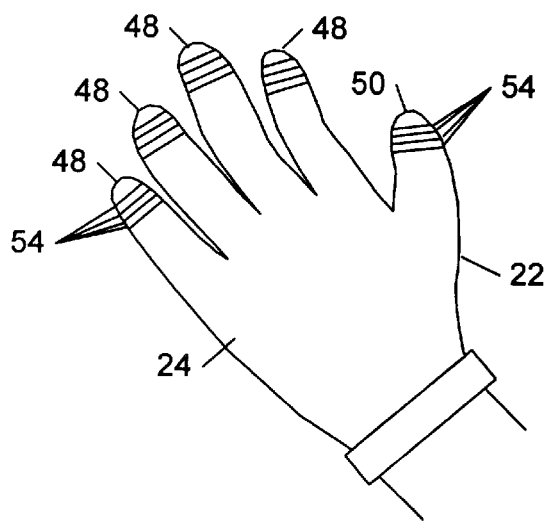
FIG. 3 is a palm-side view of an instrumented glove assembly illustrating a memory metal tactile stimulus mechanism according to the present invention.
Figure 4:
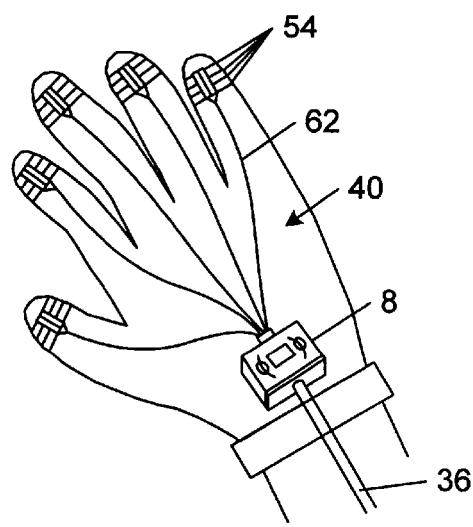
FIG. 4 is a back view of the instrumented glove assembly of FIG. 3.

FIGS. 3 and 4 illustrate one embodiment of stimulus circuit 40 disposed within a layered fabric glove 24. For ease of illustration, the outer layer fabric of glove 24 has been removed to expose the components of stimulus circuit 40. Encircling the tips of fingers 48 and thumb 50 of hand 22 are tactile feedback devices 52 comprising a plurality of loops 54 of a metal which exhibits a shape memory effect (hereinafter referred to as memory metal). With memory metals, a part deformed or stretched at one temperature will, upon being heated to a second temperature, completely recover its original shape. Through appropriate heat treatment, the part can be made to spontaneously change from one shape to the other when cycled between two temperatures. In the process, the moving metal delivers substantial force. Such metals are commonly formed as nickel titanium alloys and are readily available by the trade name "NITINOL." Each tactile feedback device 52 is connected to interval timer 28 through conductive wires 62, which together form bus 44 (FIG. 2).

Figure 5:
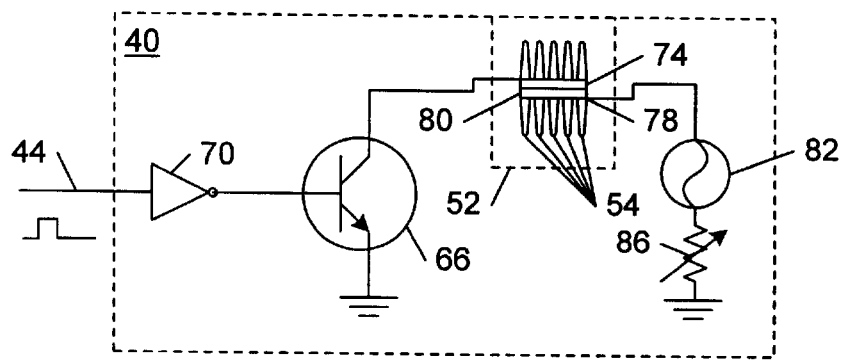
FIG. 5 is a schematic diagram of the stimulus circuit used in the embodiment of FIGS. 3 and 4.

FIG. 5 is a schematic diagram of stimulus circuit 40 used in the embodiment depicted in FIGS. 3 and 4. Stimulus circuit 40 includes a Darlington transistor 66 having its base connected for receiving signals from programmable interval timer 28 (FIG. 2) over bus 44 through an inverter 70. Timer 28 in this embodiment preferably is programmed for emitting a one-shot pulse whenever virtual operator 16 encounters virtual object 20. This minimizes the risk of overheating the memory metal. The collector of transistor 66 is connected to a current distribution strip 74 which is connected to each loop 54 of tactile feedback device 52, and the emitter of transistor 66 is referenced to a ground potential. Each loop 54 of tactile feedback device 52 is further connected to a current ground strip 78 which is separated from current distribution strip 74 by an insulator 80. Current ground strip 78 is connected to a ground potential through a fuse 82 and variable resistor 86. Accordingly, when a signal is received on the base of transistor 66 from bus 44, indicating that virtual operator 16 has encountered virtual operator 20, current flows simultaneously through each loop 54 of tactile feedback device 52. Loops 54 are heated a sufficient temperature so that they substantially simultaneously undergo a martensitic transformation to a different form (e.g., from round to oval loops), whereby the movement of the metal into the different form imparts a tactile stimulus to the physical operator.

Figure 6:
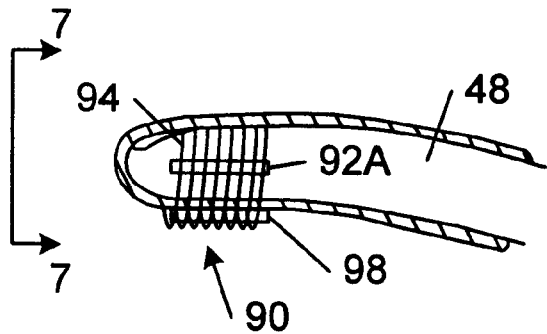
FIG. 6 is a sectional detail view of one finger of another embodiment of an instrumented glove assembly according to the present invention illustrating a solenoid unit for providing a tactile stimulus to the finger of the operator.
Figure 7:
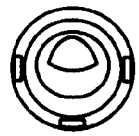
FIG. 7 is a view taken along line 7—7 of FIG. 6.
Figure 8:
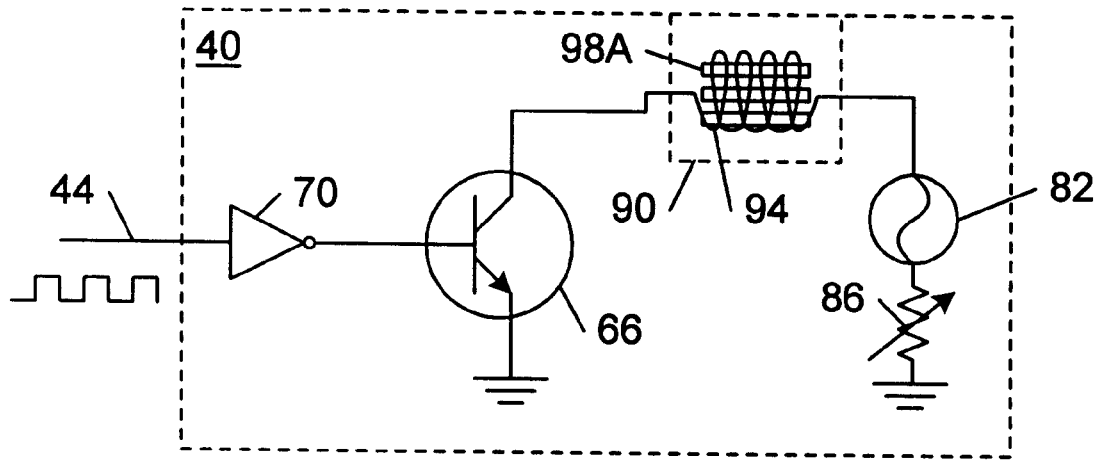
FIG. 8 is a schematic diagram of the stimulus circuit used in the embodiment of FIGS. 6 and 7.

FIGS. 6, 7, and 8 illustrate another embodiment of stimulus circuit 40, wherein a solenoid unit 90 is disposed on a finger 48 of the physical operator. As shown in FIGS. 6 and 7, solenoid 90 comprises a coil 94 encircling finger 48 and a plurality of magnets 98A disposed between coil 94 and finger 48, preferably along the underside of finger 48 as shown in FIG. 7. As shown in FIG. 8, Darlington transistor 66 has its base connected to bus 44 through inverter 70 as before, except that programmable interval timer 28 preferably is programmed for emitting a periodic signal, such as a square wave, whenever virtual operator 16 encounters virtual object 20. The collector of transistor 66 is connected to coil 94 of solenoid 90, and coil 94 is connected to a ground potential through fuse 82 and variable resistor 86. Accordingly, coil 94 receives an intermittent signal from transistor 66 and causes magnets 98A to vibrate for providing a tactile stimulus to finger 48 whenever virtual operator 16 encounters virtual object 20.

Figure 9:
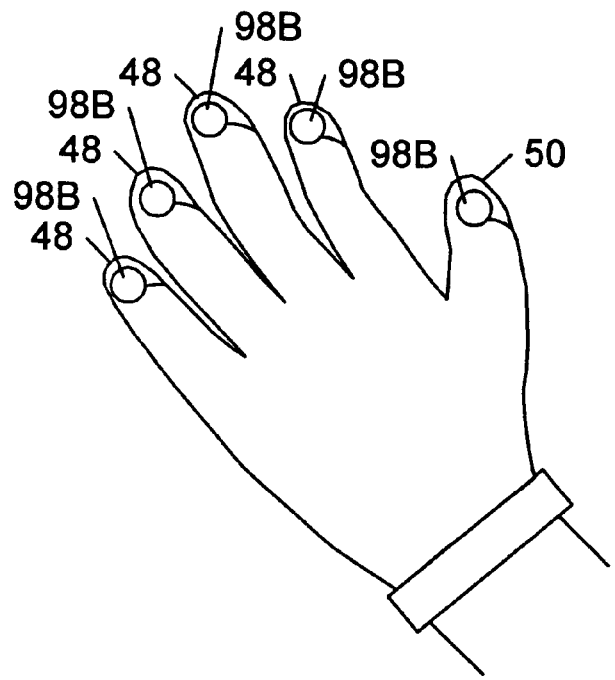
FIG. 9 is a palm-side view of an instrumented glove assembly according to the present invention incorporating a piezoceramic bender for providing a tactile stimulus to the fingers of an operator.
Figure 10:
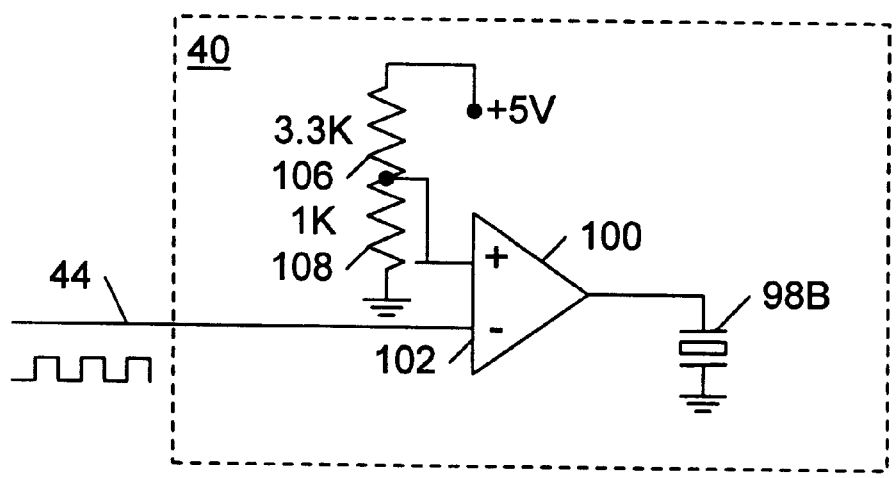
FIG. 10 is a schematic diagram of the stimulus circuit used in the embodiment of FIG. 9.

FIGS. 9 and 10 illustrate another embodiment of stimulus circuit 40 which incorporates the use of vibrating members 98B, such as piezoceramic benders, disposed on the underside of fingers 48 and thumb 50. As shown in FIG. 10, stimulus circuit 40 in this embodiment includes an operational amplifier 100 having its inverting input connected to bus 44 for receiving periodic signals from programmable interval timer 28. The non-inverting input 104 of operational amplifier 100 is connected to a voltage divider network consisting of resistors 106 and 108. When operational amplifier 100 receives a periodic signal through bus 44, it provides a periodic signal sufficient to drive vibrating members 98B to provide a tactile stimulus to fingers 48 and thumb 50 whenever virtual operator 16 encounters virtual object 20.

While the above is a complete description of a preferred embodiment of the present invention, various modifications are obvious to those skilled in the art. For example, memory metal sensors 54 may be formed in any desired shape which allows the shape memory effect to impart a tactile stimulus to fingers 48 and thumb 50, and solenoid 90 may comprise a conventional solenoid having a plunger which projects against the surface of the skin of the physical operator for providing the tactile stimulus. The stimulus circuitry described herein may be disposed anywhere in close proximity to a part of the body of the physical operator, and the part of the body stimulated need not correspond to the part of the body which is converted into the virtual operator. Each sensor 54, solenoid 90, or vibrating members 98B may be connected independently so that different fingers on virtual operator 16 activate different sensors, depending on which virtual finger encounters virtual object 20. Consequently, the description should not be used to limit the scope of the invention, which is properly described in the claims.

We claim:

1. An apparatus for providing a stimulus to a human operator, the apparatus for use in a virtual reality system in which a part of the body of the human operator is depicted as a virtual body part in a visual display, the apparatus comprising:

a signaling unit configured to provide an indication in response to the virtual body part contacting a virtual object; and a stimulus unit configured to provide a stimulus to the human operator in response to the indication from the signaling unit;

wherein the stimulus unit comprises:

a segment of memory metal disposed in close proximity to a part of the body of the human operator; and a signal generator operable to produce, depending upon the indication from the signaling unit, a signal to cause the segment of memory metal to change form, whereby a movement of the segment of memory metal into a different form imparts a tactile stimulus to the human operator.

2. The apparatus as recited in claim 1, wherein the stimulus unit provides a tactile stimulus to the human operator.

3. The apparatus as recited in claim 1, wherein the stimulus unit provides a tactile stimulus to the part of the body of the human operator which is depicted by the virtual body part.

4. The apparatus as recited in claim 1, wherein the stimulus unit moves depending upon the indication from the signaling unit.

5. The apparatus as recited in claim 1, wherein the stimulus unit includes a metallic member which moves depending upon the indication from the signaling unit; wherein the metallic member includes a nickle titanium alloy.

6. The apparatus as recited in claim 1, wherein the signal generator comprises a transistor coupled to selectively control a flow of current through the segment of memory metal depending upon the indication from the signaling unit.

7. The apparatus as recited in claim 6, wherein the signal generator provides a pulse to a base of the transistor when the virtual operator contacts the virtual object.

8. The apparatus as recited in claim 1, wherein the segment of memory metal is positioned on a fabric to be placed in close proximity to a part of the body of the human operator.

9. The apparatus as recited in claim 8, wherein the segment of memory metal is positioned on the fabric such that the segment of memory metal encircles a part of the body of the human operator when the fabric is worn by the human operator.

10. The apparatus as recited in claim 9, wherein the part of the body encircled by the segment of memory metal is a finger.

11. An apparatus for providing a stimulus to a human operator, the apparatus for use in a virtual reality system in which a part of the body of the human operator is depicted as a virtual body part in a visual display, the apparatus comprising:

a signaling unit configured to provide an indication in response to the virtual body part contacting a virtual object; and a stimulus unit configured to provide a stimulus to the human operator in response to the indication from the signaling unit, wherein the stimulus unit includes a metallic member which moves depending upon the indication from the signaling unit, wherein the metallic member includes a nickle titanium alloy.

12. An apparatus for interacting with a virtual object represented within a display, the apparatus comprising:

a processing system configured to generate a virtual representation of a part of a user's body on the display;

a signaling unit configured to provide an indication in response to the virtual representation of the part of the user's body contacting the virtual object within the display; and a stimulus unit configured to provide a stimulus to the user depending upon the indication from the signaling unit;

wherein the stimulus unit includes a segment of memory metal disposed in close proximity to the part of the user's body; and a signal generator operable to produce, depending upon the indication from the signaling unit, a signal to cause the segment of memory metal to change form, whereby a movement of the segment of memory metal into a different form imparts a tactile stimulus to the user.

13. An apparatus for use with a virtual reality system, the apparatus comprising:

a glove adapted to be worn on a part of a user's body; and a stimulus unit attached to the glove, wherein the stimulus unit is configured to provide a tactile stimulus to the user depending upon a signal from the virtual reality system;

wherein the stimulus unit includes a segment of memory metal disposed in close proximity to the part of the user's body; and a signal generator operable to produce, depending upon the indication from the signaling unit, a signal to cause the segment of memory metal to change form, whereby a movement of the segment of memory metal into a different form imparts a tactile stimulus to the user.

14. The apparatus as recited in claim 13, further comprising a flex sensor attached to the glove, wherein the flex sensor generates a signal indicative of a flexing of the part of the user's body.

15. A method for providing a tactile stimulus to a part of a body of a human operator using a virtual reality system in which a virtual operator controlled by the human operator manipulates virtual objects, the method comprising:

disposing a segment of memory metal in close proximity to a part of the body of the human operator;

producing a signal when the virtual operator contacts the virtual object; and applying a current in response to the signal sufficient to cause the segment of memory metal to change form, whereby a movement of the segment of memory metal into a different form imparts a tactile stimulus to the human operator.

* * * * *